(12) United States Patent
Border et al.

(10) Patent No.: US 9,111,498 B2
(45) Date of Patent: *Aug. 18, 2015

(54) HEAD-MOUNTED DISPLAY WITH ENVIRONMENTAL STATE DETECTION

(75) Inventors: John N. Border, Walworth, NY (US); Ronald S. Cok, Rochester, NY (US); Elena A. Fedorovskaya, Pittsford, NY (US); Sen Wang, Rochester, NY (US); Lawrence B. Landry, Victor, NY (US); Paul J. Kane, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 982 days.

This patent is subject to a terminal disclaimer.

(21) Appl. No.: 12/868,013

(22) Filed: Aug. 25, 2010

(65) Prior Publication Data

US 2012/0050143 A1 Mar. 1, 2012

(51) Int. Cl.
*G09G 3/36* (2006.01)
*G02B 27/01* (2006.01)

(52) U.S. Cl.
CPC ............ *G09G 3/3611* (2013.01); *G02B 27/017* (2013.01); *G02B 27/0172* (2013.01); *G02B 27/0179* (2013.01); *G02B 2027/0118* (2013.01); *G02B 2027/0141* (2013.01); *G09G 2340/04* (2013.01); *G09G 2354/00* (2013.01)

(58) Field of Classification Search
CPC .................. G02B 2027/0178; G02B 2027/014; G02B 2027/0187; G02B 2027/0118; G02B 2027/0132; G02B 27/017; G02B 27/0172; G02B 27/0179; G09G 3/3611; G09G 2340/04; G09G 2354/00

USPC .................................... 359/630–633; 345/4–9
See application file for complete search history.

(56) References Cited

U.S. PATENT DOCUMENTS

| 5,572,343 | A | | 11/1996 | Okamura et al. |
|---|---|---|---|---|
| 5,579,026 | A | | 11/1996 | Tabata |
| 5,621,424 | A | * | 4/1997 | Shimada et al. ................... 345/8 |
| 5,781,165 | A | | 7/1998 | Tabata |
| 5,831,712 | A | | 11/1998 | Tabata et al. |
| 5,903,395 | A | | 5/1999 | Rallison et al. |
| 6,140,980 | A | * | 10/2000 | Spitzer et al. ..................... 345/8 |
| 6,184,847 | B1 | | 2/2001 | Fateh et al. |
| 6,417,969 | B1 | * | 7/2002 | DeLuca et al. ................ 359/630 |

(Continued)

OTHER PUBLICATIONS

Nelson et al, Assessing simulator sickness in a see-through HMD effects of time dealy, time on task and task complexity, Image 2000 Conf. Proceedings, Scottsdale, AZ Jul. 2000.

*Primary Examiner* — Dwayne Bost
*Assistant Examiner* — Nalini Mummalaneni
(74) *Attorney, Agent, or Firm* — Raymond L. Owens

(57) ABSTRACT

Controlling a head-mounted display includes providing a head-mounted display, the head-mounted display includes a switchable viewing area that is switched between a transparent viewing state and an information viewing state. The transparent viewing state is transparent with respect to the viewing area and enables a user of the head-mounted display to view the scene outside the head-mounted display in the user's line of sight. The information viewing state is opaque with respect to the viewing area and displays information in the switchable viewing area visible to a user of the head-mounted display. An external environmental state detector provides an external stimulus notification in response to a detected change in the external environment and causes the viewing state to automatically switch in response to the external stimulus notification.

27 Claims, 15 Drawing Sheets

(56) References Cited

U.S. PATENT DOCUMENTS

| | | |
|---|---|---|
| 6,497,649 B2 | 12/2002 | Parker et al. |
| 6,829,095 B2 | 12/2004 | Amitai |
| 6,847,336 B1 | 1/2005 | Lemelson et al. |
| 7,710,655 B2 | 5/2010 | Freeman et al. |
| 2002/0044152 A1* | 4/2002 | Abbott et al. ............... 345/629 |
| 2003/0132944 A1* | 7/2003 | Smith ............................ 345/581 |
| 2007/0171329 A1 | 7/2007 | Freeman et al. |
| 2007/0237491 A1 | 10/2007 | Kraft |
| 2010/0013739 A1* | 1/2010 | Sako et al. ......................... 345/8 |
| 2010/0107066 A1 | 4/2010 | Hiltola et al. |

\* cited by examiner

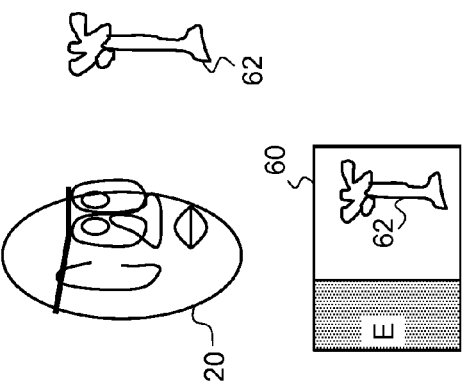
FIG. 9D
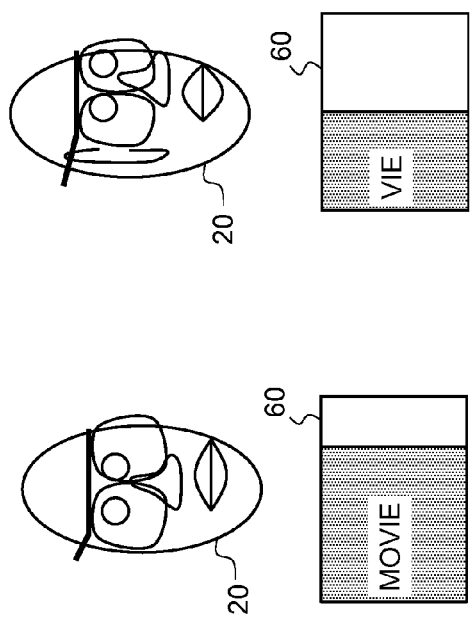
FIG. 9C
FIG. 9E
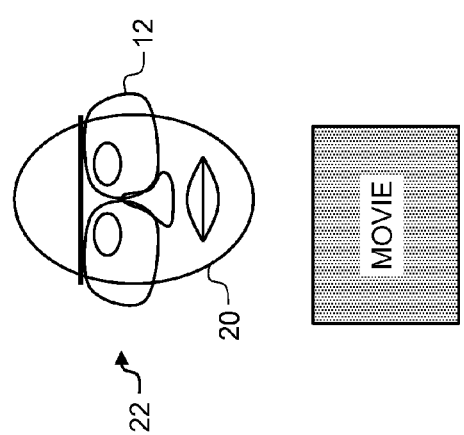
FIG. 9B
FIG. 9A
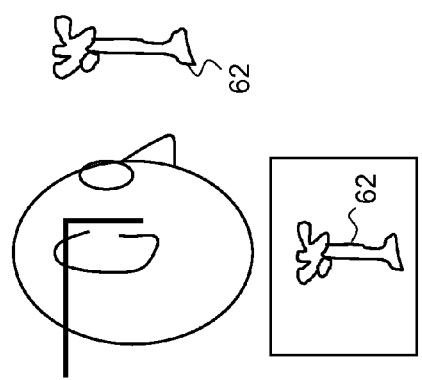

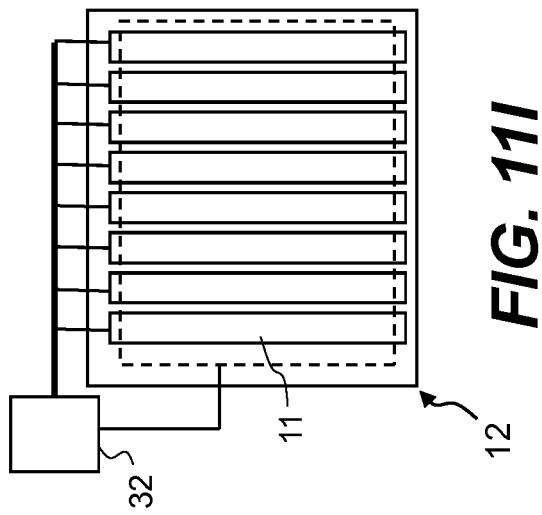
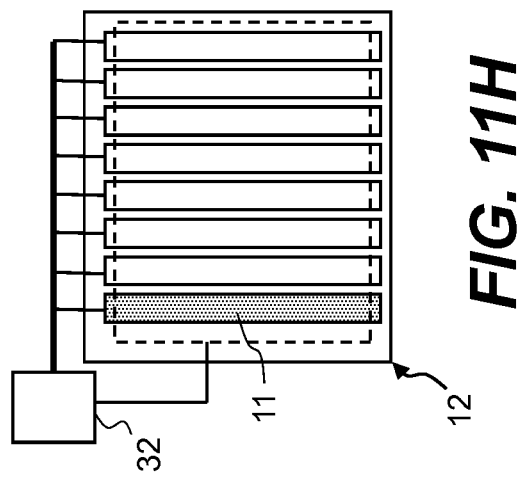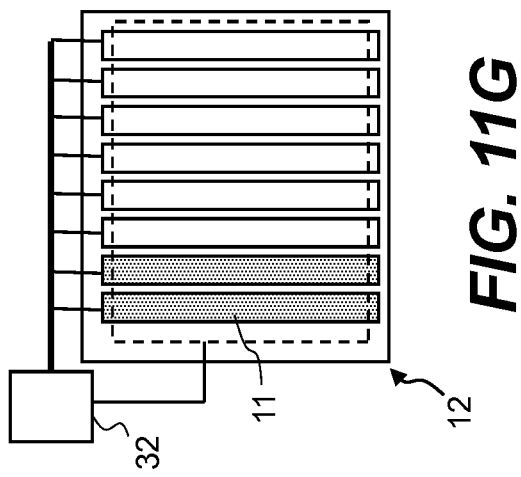

HEAD-MOUNTED DISPLAY WITH ENVIRONMENTAL STATE DETECTION

CROSS REFERENCE TO RELATED APPLICATIONS

Reference is made to commonly assigned U.S. patent application Ser. No. 12/862,978 filed concurrently herewith, entitled "Head-Mounted Display Control by John N. Border et al; U.S. patent application Ser. No. 12/862,985 filed concurrently herewith, entitled "Head-Mounted Display With Biological State Detection" by John N. Border et al; U.S. patent application Ser. No. 12/862,998 filed concurrently herewith, entitled "Head-Mounted Display With Eye State Detection" by John N. Border et al, and U.S. patent application Ser. No. 12/862,994 filed concurrently herewith, entitled "Switchable Head-Mounted Display" by John N. Border et al, the disclosures of which are incorporated herein.

FIELD OF THE INVENTION

The present invention relates to a head-mounted display. More particularly, the present invention relates to a control method for reducing motion sickness when using such a display in response to an external stimulus.

BACKGROUND OF THE INVENTION

Head-mounted displays are widely used in gaming and training applications. Such head-mounted displays typically use electronically controlled displays mounted on a pair of glasses or a helmet with supporting structures such as ear, neck, or head pieces that are worn on a user's head. Displays are built into the glasses together with suitable optics to present electronic imagery to a user's eyes.

Most head-mounted displays provide an immersive effect in which scenes from the real world are obscured and the user can see, or is intended to see, only the imagery presented by the displays. In the present application, immersive displays are considered to be those displays that are intended to obscure a user's view of the real world to present information to the user from the display. Immersive displays can include cameras to capture images of the scene in front of the user so that this image information can be combined with other images to provide a combined image of the scene where portions of the scene image have been replaced to create a virtual image of the scene. In such an arrangement, the display area is opaque. Such displays are commercially available, for example from Vuzix.

Alternatively, some head-mounted displays provide a see-through display for an augmented reality view in which real-world scenes are visible to a user but additional image information is overlaid on the real-world scenes. Such an augmented reality view is provided by helmet mounted displays found in military applications and by heads-up displays (HUDs) in the windshields of automobiles. In this case, the display area is transparent. FIG. 1 shows a typical prior-art head-mounted display that is a see-through display 10 in a glasses format. The head-mounted display 10 includes: ear pieces 14 to locate the device on the user's head; lens areas 12 that have variable occlusion members 7; microprojectors 8 and control electronics 9 to provide images to at least the variable occlusion members 7.

U.S. Pat. No. 6,829,095 describes a device with a see-through display 10 or augmented reality display in a glasses format where image information is presented within the lens areas 12 of the glasses. The lens areas 12 of the glasses in this patent include waveguides to carry the image information to be displayed from an image source, with a built-in array of partially reflective surfaces to reflect the information out of the waveguide in the direction of the user's eyes. FIG. 2A shows a cross-section of a lens area 12 including: a waveguide 13; partial reflectors 3 along with; a microprojector 8 to supply a digital image; light rays 4 passing from the microprojector 8, through the waveguide 13, partially reflecting off the partial reflectors 3 and continuing on to the user's eye 2. As seen in FIG. 2A, light rays 5 from the ambient environment pass through the waveguide 13 and partial reflectors 3 as well as the transparent surrounding area of the lens area 12 to combine with the light 4 from the microprojector 8 and continue on to the user's eye 2 to form a combined image. The combined image in the area of the partial reflectors 3 is extra bright because light is received by the user's eye 2 from both the microprojector 8 and light rays 5 from the ambient environment. FIG. 4 shows an illustration of a combined image as seen by a user from a see-through display 10 as described in U.S. Pat. No. 6,829,095 wherein the central image is an overly bright image composed of both an image of the ambient environment and a digital image presented by a microprojector. A reflectance of 20% to 33% is suggested in U.S. Pat. No. 6,829,095 for the partial reflectors 3 to provide a suitable brightness of the image information when combined with the image of the scene as seen in the see-through display. Because the array of partial reflectors 3 is built into the waveguide 13 and the glasses lens areas 12, the reflectance of the partial reflectors 3 should be selected during manufacturing and is not adjustable. Combined images produced with this method are of a low image quality that is difficult to interpret as shown in FIG. 4.

United States Patent Application 2007/0237491 presents a head-mounted display that can be changed between an opaque mode where image information is presented and a see-through mode where the image information is not presented and the display is transparent. This mode change is accomplished by a manual switch that is operated by the user's hand or a face muscle motion. This head-mounted display is either opaque or fully transparent. Motion sickness or simulator sickness is a known problem for immersive displays because the user cannot see the environment well. As a result, motion on the part of a user, for example head motion, does not correspond to motion on the part of the display or imagery presented to the user by the display. This is particularly true for displayed video sequences that incorporate images of moving scenes that do not correspond to a user's physical motion. U.S. Pat. No. 6,4976,49 discloses a method for reducing motion sickness produced by head movements when viewing a head-mounted immersive display. The patent describes the presentation of a texture field surrounding the displayed image information, wherein the texture field is moved in response to head movements of the user. This patent is directed at immersive displays.

Motion sickness is less of an issue for augmented reality displays since the user can see the environment better, however, the imaging experience is not suitable for viewing high quality images such as movies with a see-through display due to competing image information from the external scene and a resulting degradation in contrast and general image quality. Aspects of the problem of motion sickness associated with helmet mounted see-through displays is described in the paper "Assessing simulator sickness in a see-through HMD: effects of time delay, time on task and task complexity" by W. T. Nelson, R. S. Bolia, M. M. Roe and R. M. Morley; Image 2000 Conf, Proceedings, Scottsdale, Ariz., July 2000. In this paper, the specific problem of image movement lagging behind the head movement of the user is investigated as a cause of motion sickness.

U.S. Pat. No. 7,710,655 describes a variable occlusion member that is attached to the see-through display as a layer in the area that image information is presented by the display. The layer of the variable occlusion member is used to limit the ambient light that passes through the see-through display from the external environment. The variable occlusion layer is adjusted from dark to light in response to the brightness of the ambient environment to maintain desirable viewing conditions. FIG. 1 shows a variable occlusion member 7 located in the center of the lens area 12 wherein the variable occlusion member 7 is in a transparent state. FIG. 2A shows a variable occlusion member 7 wherein, the variable occlusion member 7 is in a darkened state. Similarly, FIG. 2A shows a cross-section of a variable occlusion member 7 in relation to the waveguide 13 and the partial reflectors 3 wherein the variable occlusion member 7 is in a transparent state. FIG. 2B shows the cross-section wherein the variable occlusion member 7 is in a darkened state so that light rays 5 from the ambient environment are substantially blocked in the area of the variable occlusion member 7 and light rays 5 from the ambient environment only pass through the transparent surrounding area of lens area 12 to continue on the user's eye 2. As a result, the combined image seen by the user is not overly bright in the area of the variable occlusion member 7 because substantially only light from the microprojector is seen in that area. FIG. 3 illustrates the variable occlusion member 7 in a dark state. FIG. 5 shows an illustration of the combined image as seen by the user where the variable occlusion member is in a darkened state, as in FIG. 3. Although image quality is improved by the method of U.S. Pat. No. 7,710,655, compensating for head movement of the user to provide further improved image quality and enhanced viewing comfort is not considered.

There is a need, therefore, for an improved head-mounted display that enables viewing of high quality image information with reduced motion sickness and improved viewing comfort for the user.

SUMMARY OF THE INVENTION

In accordance with the present invention, there is provided a method of controlling a head-mounted display, comprising the steps of:

A method of controlling a head-mounted display, comprising the steps of:
 providing a head-mounted display, the head-mounted display including a switchable viewing area that is switched between a transparent viewing state and an information viewing state, wherein:
  i) the transparent viewing state is transparent with respect to the viewing area and enables a user of the head-mounted display to view the scene outside the head-mounted display in the user's line of sight; and
  ii) the information viewing state is opaque with respect to the viewing area and displays information in the switchable viewing area visible to a user of the head-mounted display;
 providing an external environmental state detector that provides an external stimulus notification in response to a detected change in the external environment; and
 causing the viewing state to automatically switch in response to the external stimulus notification.

In accordance with another aspect of the present invention, there is provided a head-mounted display, comprising:

A head-mounted display apparatus, comprising:
 a head-mounted display, the head-mounted display including a switchable viewing area that is switched between a transparent state and an information state, wherein:
  i) the transparent state enables a user of the head-mounted display to see the real world outside the head-mounted display in the user's line of sight;
  ii) the information state is opaque and displays information in the switchable viewing area visible to a user of the head-mounted display; and
 an external environmental-state detector that provides an external stimulus notification in response to a detected change in the external environment; and
 a controller for causing the viewing state to automatically switch in response to the external stimulus notification.

The present invention provides an improved head-mounted display that enables viewing of high quality image information with reduced motion sickness and improved viewing comfort for the user in response to an external stimulus.

BRIEF DESCRIPTION OF THE DRAWINGS

The above and other objects, features, and advantages of the present invention will become more apparent when taken in conjunction with the following description and drawings, wherein identical reference numerals have been used, where possible, to designate identical features that are common to the figures, and wherein:

FIGS. 9A to 9E are successive illustrations of a user's head position and the corresponding images as the user's head rotates about a vertical axis according to an embodiment of the present invention;

FIGS. 11A-11I illustrate successive stages in controlling spatially adjacent independently controllable switchable viewing areas from one state to a different state according to an embodiment of the present invention;

Figure 1:
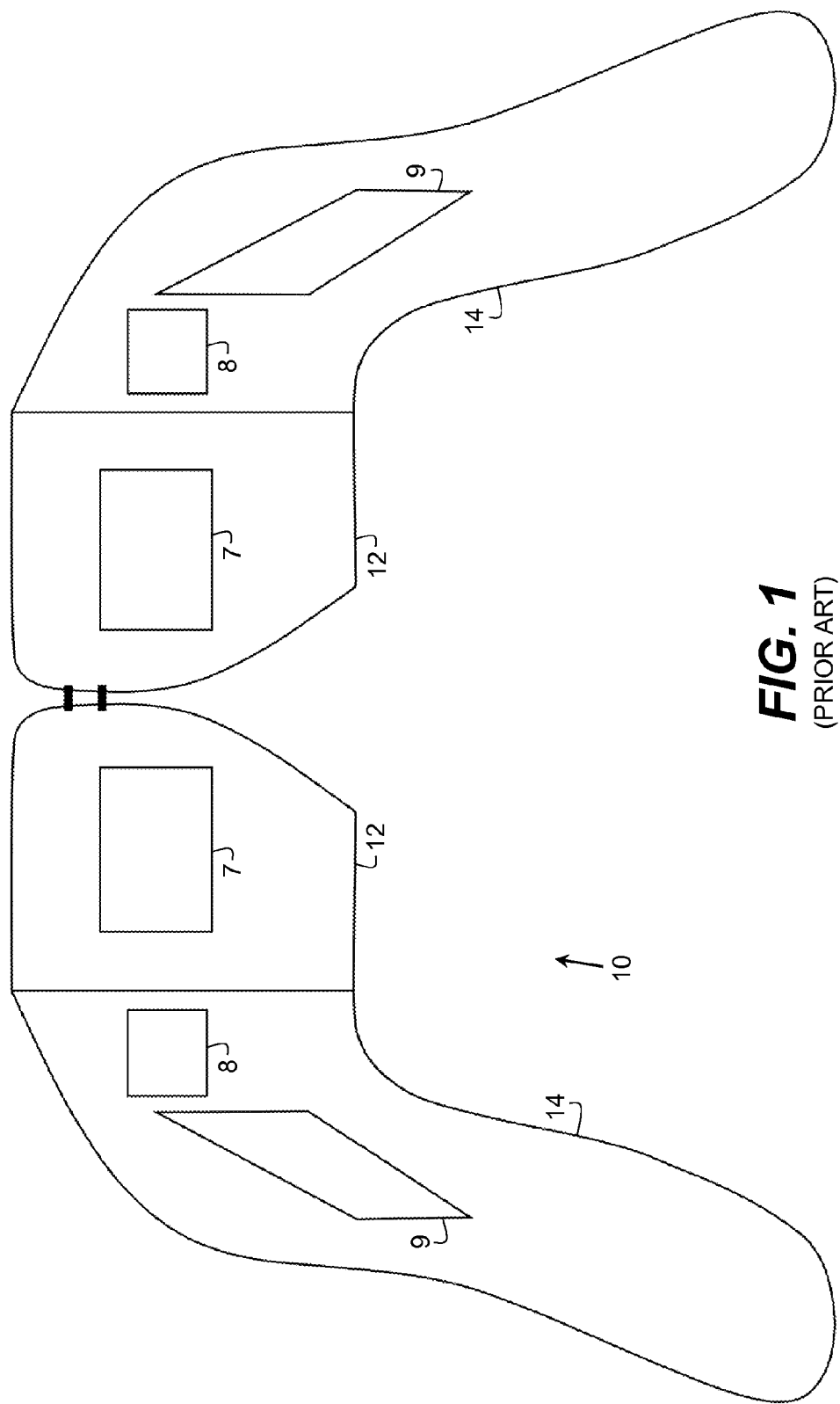
FIG. 1 is an illustration of a prior-art heads-up display with a variable occlusion member in a transparent state.
Figure 2A:
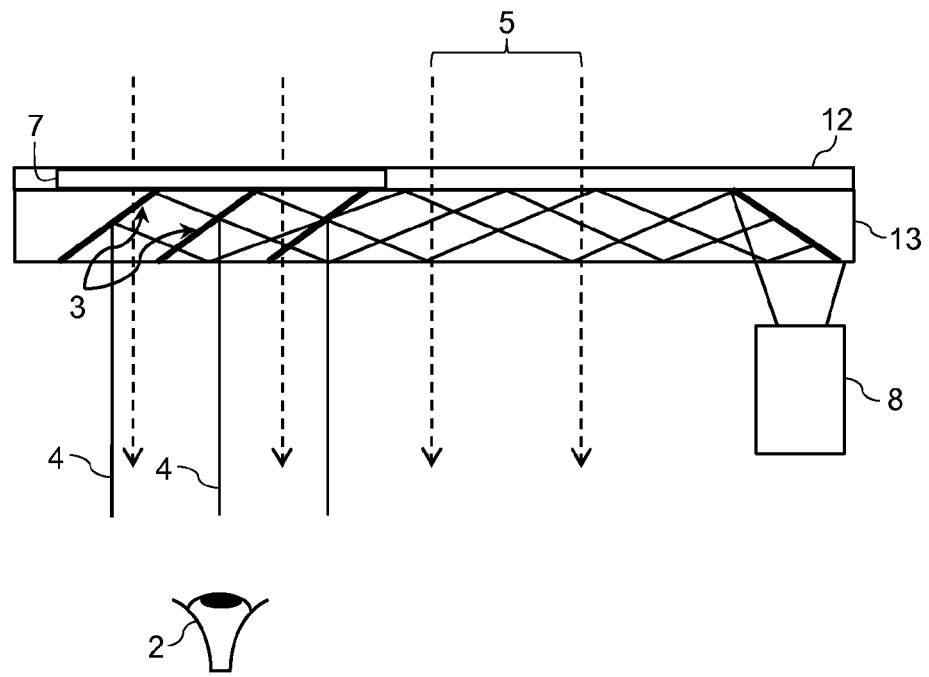
FIG. 2A is a schematic of a cross-section of a prior-art lens area of the heads-up display and the associated light from the microprojector and from the ambient environment with a variable occlusion member in a transparent state.
Figure 2B:
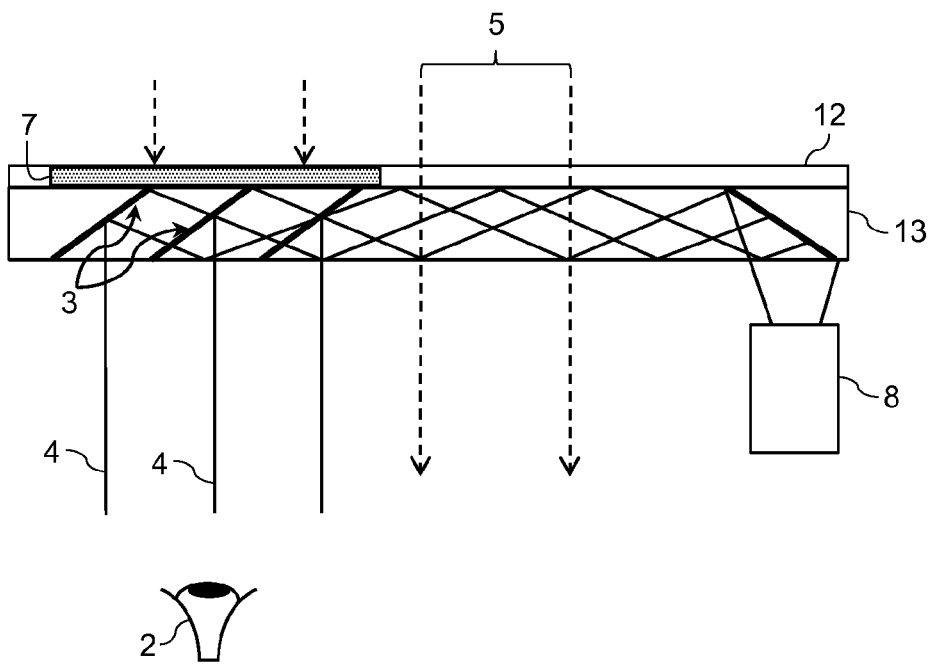
FIG. 2B is a schematic of a cross-section of a prior-art lens area of the heads-up display and the associated light from the microprojector and from the ambient environment with a variable occlusion member in a darkened state.
Figure 3:
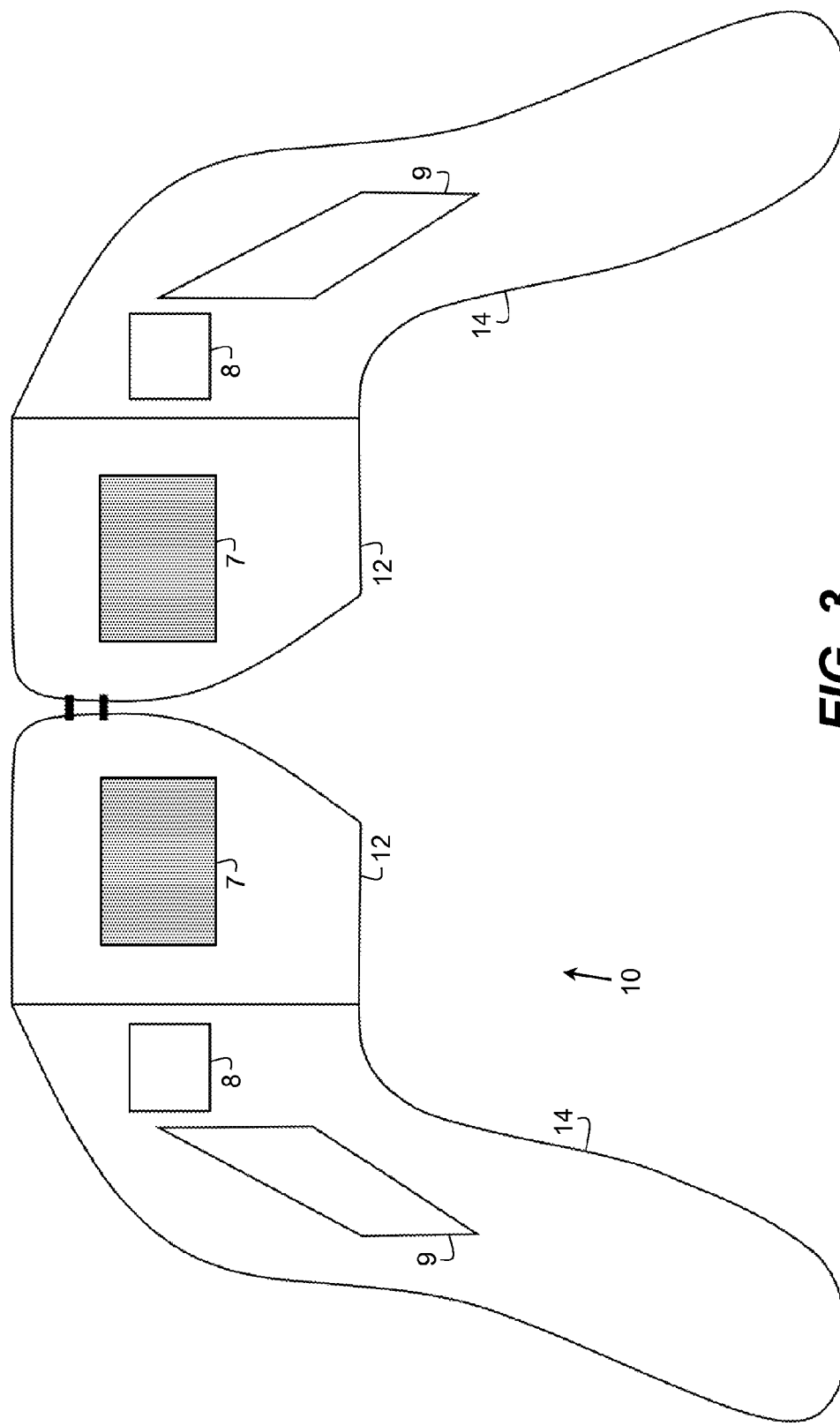
FIG. 3 is an illustration of a prior-art heads-up display with a variable occlusion member in a darkened state.
Figure 4:
FIG. 4 is an illustration of a combined image on a prior-art see-through heads-up display either without a variable occlusion member or with a variable occlusion member in a transparent state as seen by a user.
Figure 5:
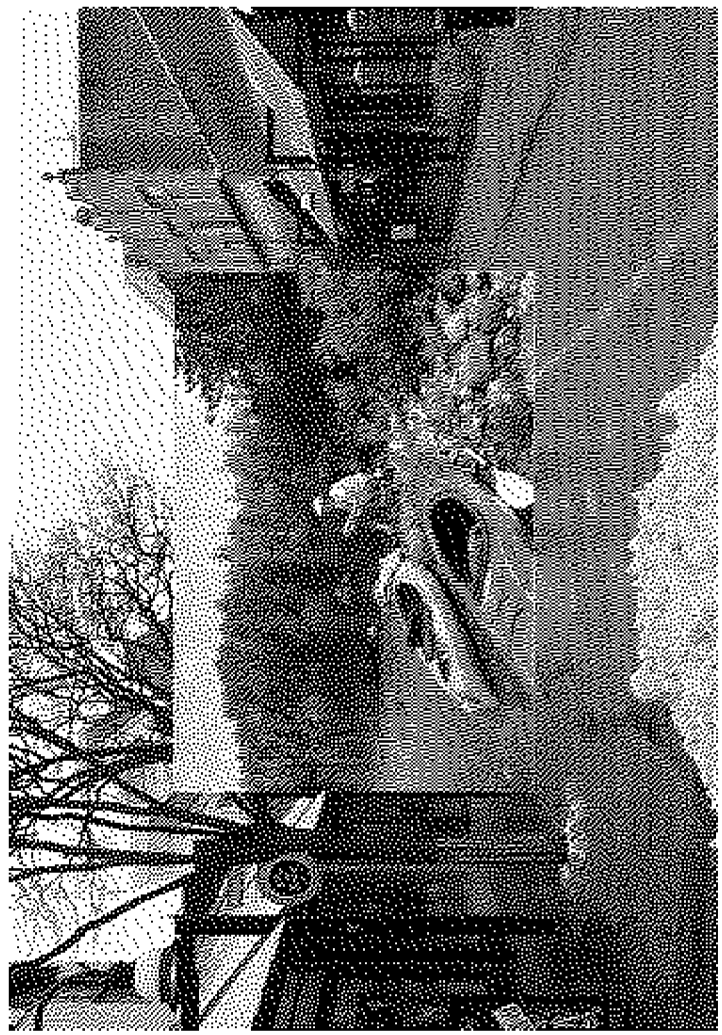
FIG. 5 is an illustration of a combined image on a prior-art see-through heads-up display with a variable occlusion member in a darkened state as seen by a user.

Because the various layers and elements in the drawings have greatly different sizes, the drawings are not to scale.

DETAILED DESCRIPTION OF THE INVENTION

A wide variety of head-mounted displays are known in the art. The head-mounted displays include a microprojector or image scanner to provide image information, relay optics to focus and transport the light of the image information to the display device and a display device that is viewable by the user's eyes. Head-mounted displays can provide image information to one eye of the user or both eyes of the user. Head-mounted displays that present image information to both eyes of the user can have one or two microprojectors. Monoscopic viewing in which the same image information is presented to both eyes is done with head-mounted displays that have one or two microprojectors. Stereoscopic viewing typically requires a head-mounted display that has two microprojectors.

The microprojectors include image sources to provide the image information to the head-mounted display. A variety of image sources are known in the art including, for example, organic light-emitting diode (OLED) displays, liquid crystal displays (LCDs), or liquid crystal on silicon (LCOS) displays.

The relay optics can comprise refractive lenses, reflective lenses, diffractive lenses, holographic lenses or waveguides. For a see-through display the display should permit at least a partial view of the ambient environment or scene outside the head-mounted display within the user's line of sight. Suitable displays known in the art in which a digital image is presented for viewing by a user include a device or surface including waveguides, polarized reflecting surfaces, partially reflecting surfaces, or switchable mirrors. The present invention concerns display devices that are useable as see-through displays and that are useable to present information to a user.

According to the present invention, the head-mounted display includes a viewing area wherein at least a portion of the viewing area is a switchable viewing area that is switched between a transparent state and an information state. In both states, information is projected and viewed by a user. In the information state, the viewed area is substantially opaque, while in the transparent state, the viewed area is substantially transparent in at least some portions of the viewing area. Thus, the transparent state enables the user of the head-mounted display to see at least portions of the ambient or scene in front of the user. In contrast, the information state enables the user to see projected digital images in at least portions of the viewing area. In some embodiments of the present invention, the switchable viewing area is a central region of the viewing area that is surrounded by a substantially transparent area that is not switchable. In addition, in some embodiments of the invention, the switchable viewing area is comprised of multiple areas that are independently switchable. In other embodiments of the present invention, projected digital images are presented on the multiple areas in response to detected external stimuli such that perceived motion sickness by the user is reduced.

Figure 8A:
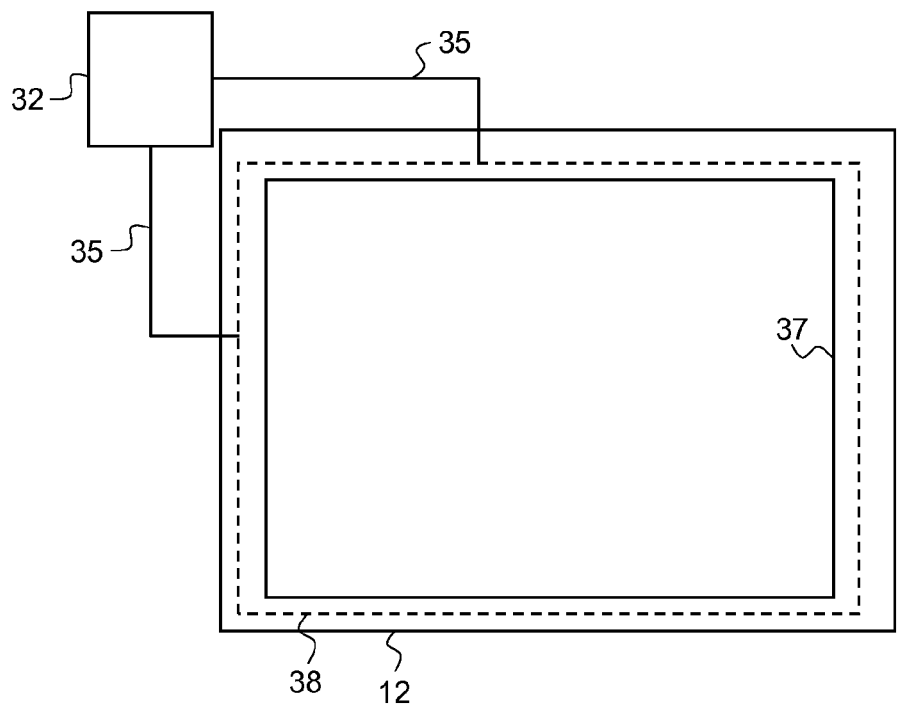
FIGS. 8A and 8B are schematics with multiple independently controllable regions that are a series of rectangular shaped areas spanning the height of switchable viewing area.

In a first embodiment of the present invention, the viewing area of the head-mounted display includes a switchable viewing area that is comprised of a single switchable area that is switched from a substantially opaque information state to a substantially transparent state or vice versa. FIG. 8A shows a schematic diagram of a switchable viewing area comprised of a single area that is controlled with a single control signal from the controller 32 by control wires 35 to a transparent electrode 37 and a transparent backplane electrode 38 on the switchable area. The transparent electrodes 37 and 38 are separated by an electrically responsive material such as a liquid crystal pi cell layer, a polymer stabilized liquid crystal layer, a switchable reflective material layer or an electrochromic layer. The lens area 12 of the head-mounted display apparatus 22 is comprised entirely of the switchable area or alternately the lens area 12 is comprised of a first portion that is a switchable area and a second portion that is not switchable and is substantially transparent.

Figure 8B:
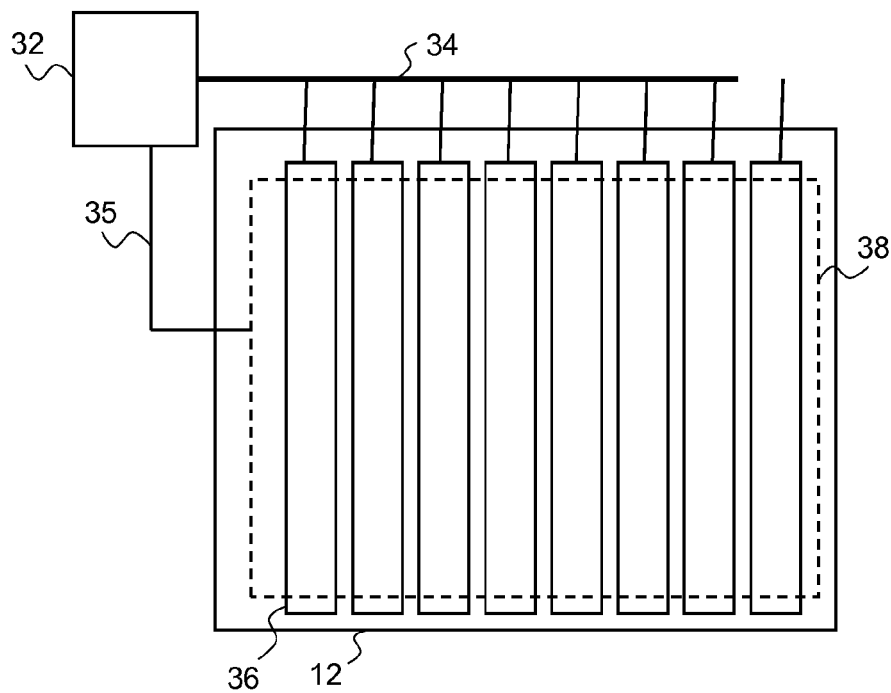
Figure 10C:
FIGS. 10A to 10E are successive illustrations of combined images as seen by a user as the user's head rotates about a vertical axis according to an embodiment of the invention.
Figure 10B:
Figure 10E:
Figure 10D:
Figure 10A:
Figure 11A:
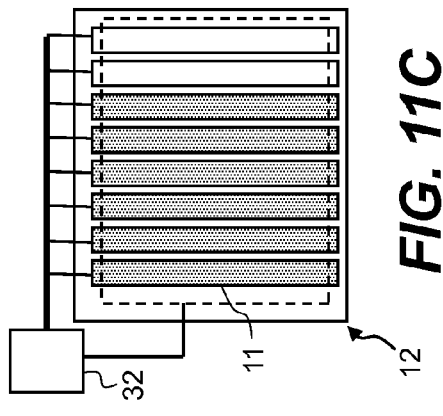
Figure 11B:
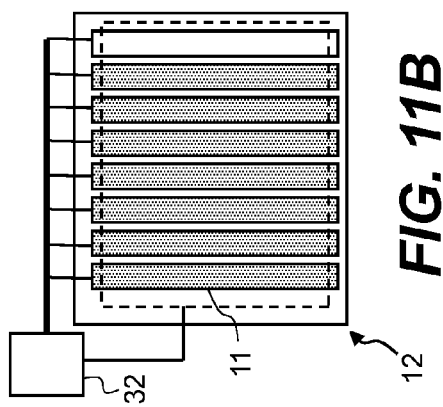
Figure 11C:
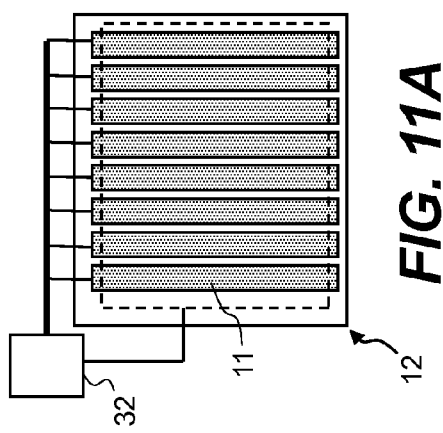
Figure 11D:
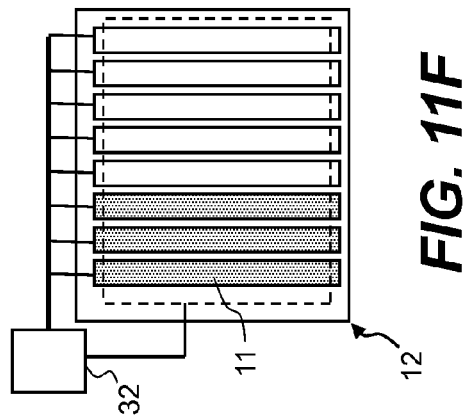
Figure 11E:
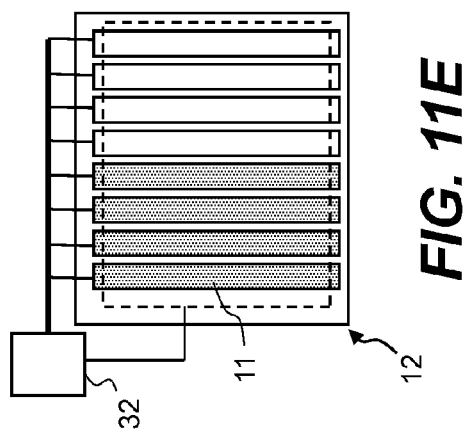
Figure 11F:
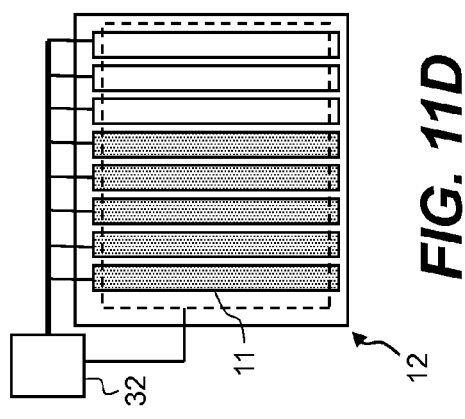

In another embodiment of the invention, the switchable viewing area is comprised of a series of rectangular regions that extend across the viewing area. FIG. 8B shows a schematic diagram of a lens area 12 having switchable viewing areas that are controlled by a controller 32 (for example, part of control electronics) and connected by a series of wires 34 connected to a series of rectangular transparent electrodes 36 arranged across the lens area 12 and a single back plane transparent electrode 38 connected with control wire 35. Again, the transparent electrodes 36 and 38 are separated by an electrically responsive material. In this embodiment of the invention, each of the rectangular regions is switched independently. Transparent electrodes 36 are shaped in other ways to provide a variety of independently controllable switchable areas.

Referring to FIGS. 9A-9E, the embodiment illustrated in FIG. 8B is employed in the present invention as follows. In an initial state, the head-mounted display apparatus of the present invention is in the information state and a user 20 (upper portion of the illustration) is viewing a movie on the lens area of the display (lower part of the illustration). In FIG. 9A, the user is facing straight ahead. FIGS. 10A to 10E show illustrations of representative combination images (similar to the lower portion of the illustrations in FIGS. 9A to 9E) as seen by a user 20 viewing the lens area 12 of the head-mounted display apparatus 22 in this embodiment of the invention where the image of the ambient environment as seen in a see-through case surrounds digital image information presented by the head-mounted display apparatus 22. It should be noted that FIGS. 10A to 10E show a relatively small switchable viewing area located in the center of the lens area 12; however, the switchable viewing area can comprise a much larger portion of the lens area 12 or even all of the lens area 12 or alternately the switchable viewing area is located to one side of the lens area 12.

Referring to FIG. 9B, an external stimulus, such as an interruption (e.g. a noise) that takes place to the side of the user 20, causes the user 20 to rotate his or her head toward the interruption. Rapid rotations such as this are known to cause motion sickness when the image information presented on the display does not move in the same way as the user moves. In the embodiment of the present invention, the head rotation of the user is detected by a detector that provides a notification to the head-mounted display apparatus control computer (not shown, e.g. control electronics or microprocessor), and the image information (e.g. the movie) being presented on the switchable viewing area is moved in a direction opposite to the head rotation by panning the image across the viewing area of the display, thereby presenting a reduced portion of the image information to the user, as illustrated by the new viewing area location of the word "Movie" in the illustration of FIG. 9B. At the same time, the portion 60 of the switchable viewing area (corresponding to the right-most electrode in the switchable viewing area) is switched into the transparent state by the controller applying an appropriate electric field to the corresponding electrode and the user rotates his or her head slightly. The degree of head rotation is matched to the size of the portion of the switchable viewing area that is switched (portions corresponding to more than one electrode are switched).

Referring to FIG. 9C, the process of FIG. 9B is continued further. The user's head rotates further, the image information of the movie is further panned across the switchable viewing area of the display presenting a still smaller portion of the image information to the user 20, and the switched portion correspondingly increases in size. Referring to FIG. 9D, the process of FIG. 9C is continued further again. The user's head rotates further, the image information of the movie is further panned across the switchable viewing area of the display, and the switched portion correspondingly increases in size again. In FIG. 9D, an object 62 in the real-world scene in the user's line of sight appears. This object 62 is viewed by the user at one side of the transparent portion 60 of the switchable viewing area. Finally, in FIG. 9E, the user has rotated his or her head so that the object 62 is directly in front of him or her and the image information is no longer presented in the switchable viewing area because the entire switchable viewing area has been switched to the transparent state so that object 62 is directly viewed in the real world scene by the user.

The process described with respect to the illustrations of FIGS. 9A-9E is reversed when the user rotates his or her head back in the opposite direction so that the appearance of the switchable viewing area and the image information presented will transition from FIG. 9E to FIG. 9A. In an alternative embodiment of the present invention, the process can extend only part-way, for example, a user might rotate his or her head to the point illustrated in FIG. 9C and then return to the position illustrated in FIG. 9A. In a further embodiment of the invention, the appearance of the switchable viewing area and the image information presented will automatically transition back from FIG. 9E to FIG. 9A following an interruption after a predetermined period of time without the user rotating his or her head in the opposite direction thereby again presenting the full image information to the user.

FIGS. 11A to 11I illustrate successive stages of controlling a one-dimensional array of independently controllable switchable viewing areas 16 in a lens area 12 with a controller 32. In this illustration, spatially adjacent independently controllable switchable viewing areas are successively switched to gradually change the display area from one state to another, for example to enable the transition from the information to the transparent state illustrated in FIGS. 9A-9E. In this embodiment, the controller simultaneously controls one of the independently controllable switchable viewing areas to be at least partially transparent while another of the independently controllable switchable viewing areas is opaque. Furthermore, each of the independently controllable switchable viewing areas is switched at a different time.

Figure 7A:
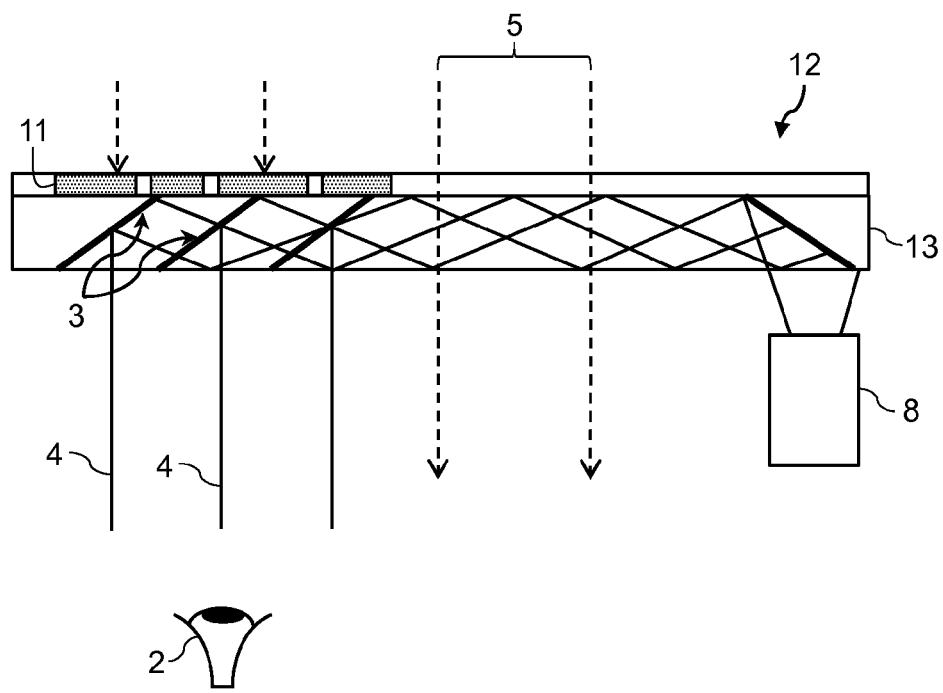
FIG. 7A is a schematic of a cross-section of a lens area of a heads-up display in an embodiment of the invention with multiple regions shown in a darkened state.
Figure 7B:
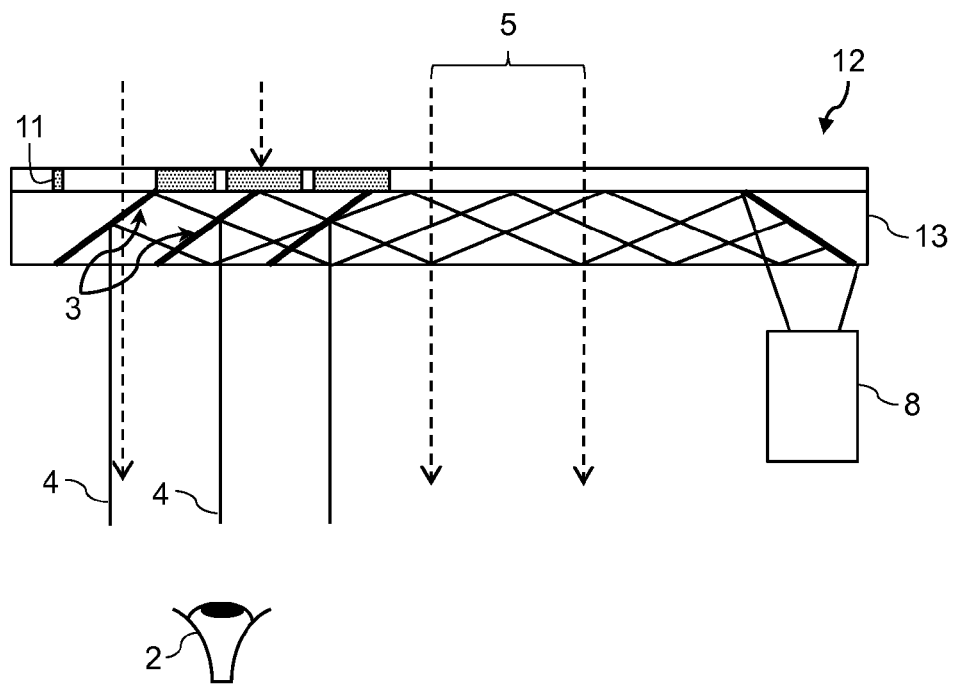
FIG. 7B is a schematic of a cross-section of a lens area of a heads-up display in an embodiment of the invention with multiple regions wherein some of the regions are shown in a transparent state and other regions are shown in a darkened state.

FIGS. 7A and 7B are cross sections of the lens area 12 with switchable viewing areas 11 in the light absorbing (information) state (FIG. 7A) or with one switchable viewing area 11 in the transmissive (transparent) state (FIG. 7B) so that ambient light rays 5 are either occluded by the switchable viewing area 11 or pass through the switchable viewing area 11. In either case, light rays 4 from the microprojector 8 travel through waveguide 13 and are reflected from the partial reflectors 3 to a user's eye 2. The illustrated states of the switchable viewing area 11 in FIGS. 7A and 7B correspond to the images of FIGS. 9A and 9B and 11A and 11B, respectively.

Figure 6:
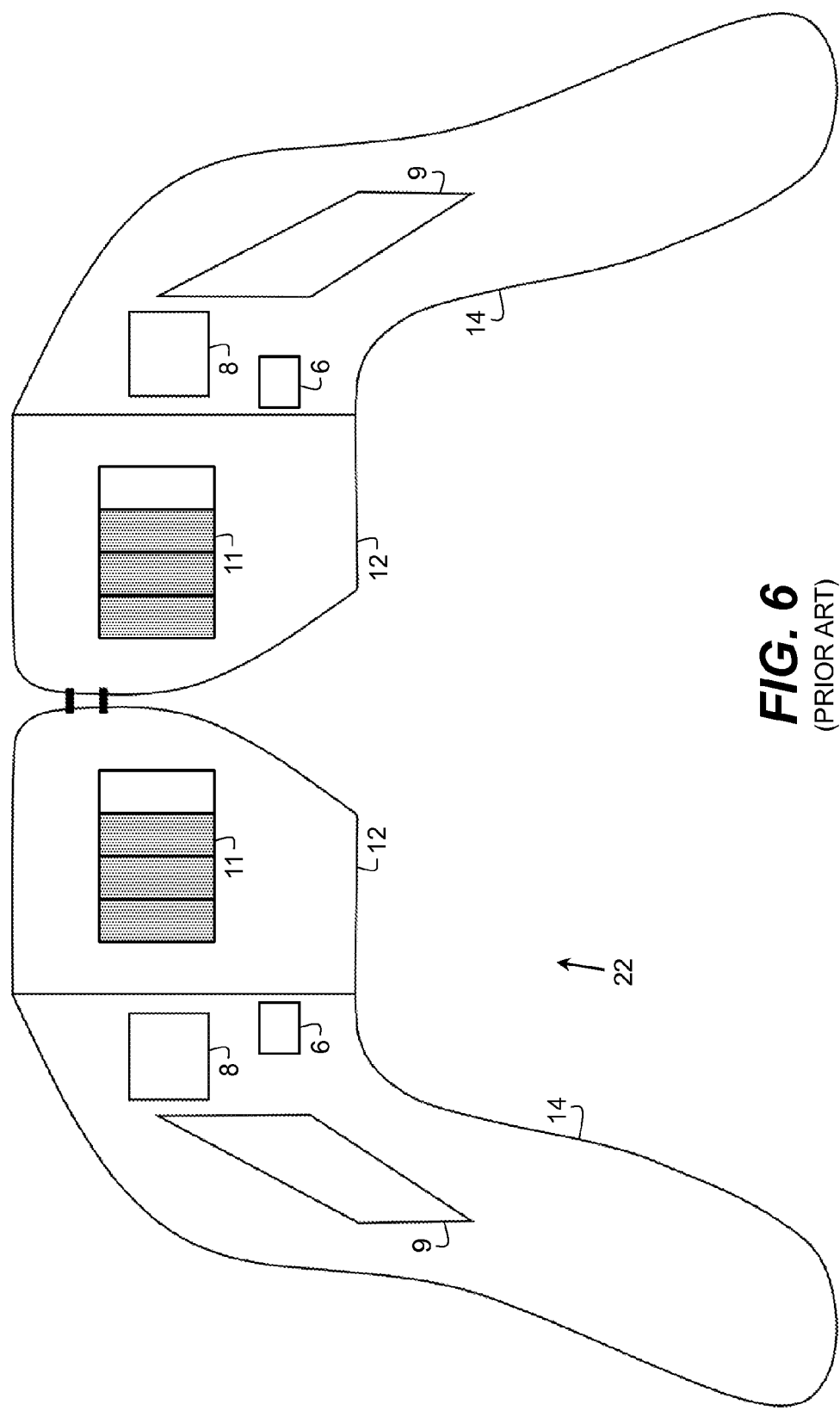
FIG. 6 is an illustration of a heads-up display in an embodiment of the invention with state detectors.

Referring to FIG. 6, in accordance with one embodiment of the present invention, a head-mounted display apparatus 22 includes a projector 8 and supporting earpieces 14 in a glasses- or helmet-mounted format, the head-mounted display apparatus 22 also including one or more lens areas 12 with switchable viewing areas 11 that are switched between a transparent state and an information state. In the transparent state the switchable viewing area 11 is substantially transparent and the user of the head-mounted display apparatus 22 can view the ambient environment in front of the head-mounted display in the user's line of sight. In the information state, the switchable viewing area 11 is substantially opaque and digital image information is displayed in the region of the switchable viewing area 11 so the image information is visible to the user. In an embodiment of the invention, the viewing state of the switchable viewing area 11 automatically switches from the information state to the transparent state and vice versa, in response to an external stimulus notification. As used herein, an external stimulus is a stimulus detected by stimulus detector 6 attached to the head-mounted display apparatus 22 or detected by an external sensor that is connected to the head-mounted display apparatus 22 either by wires or by wireless (not shown in FIG. 6). An external stimulus notification is provided by the control electronics 9 when the stimulus detector indicates that a detectable change has occurred. Alternately, the invention includes automatic switching of viewing states responsive to the image information displayed on the display in the head-mounted display apparatus 22, for example stimuli from the environment or the user. A notification is a signal from a sensor to a controller of the head-mounted display apparatus 22 in response to the external stimulus.

Figure 12:
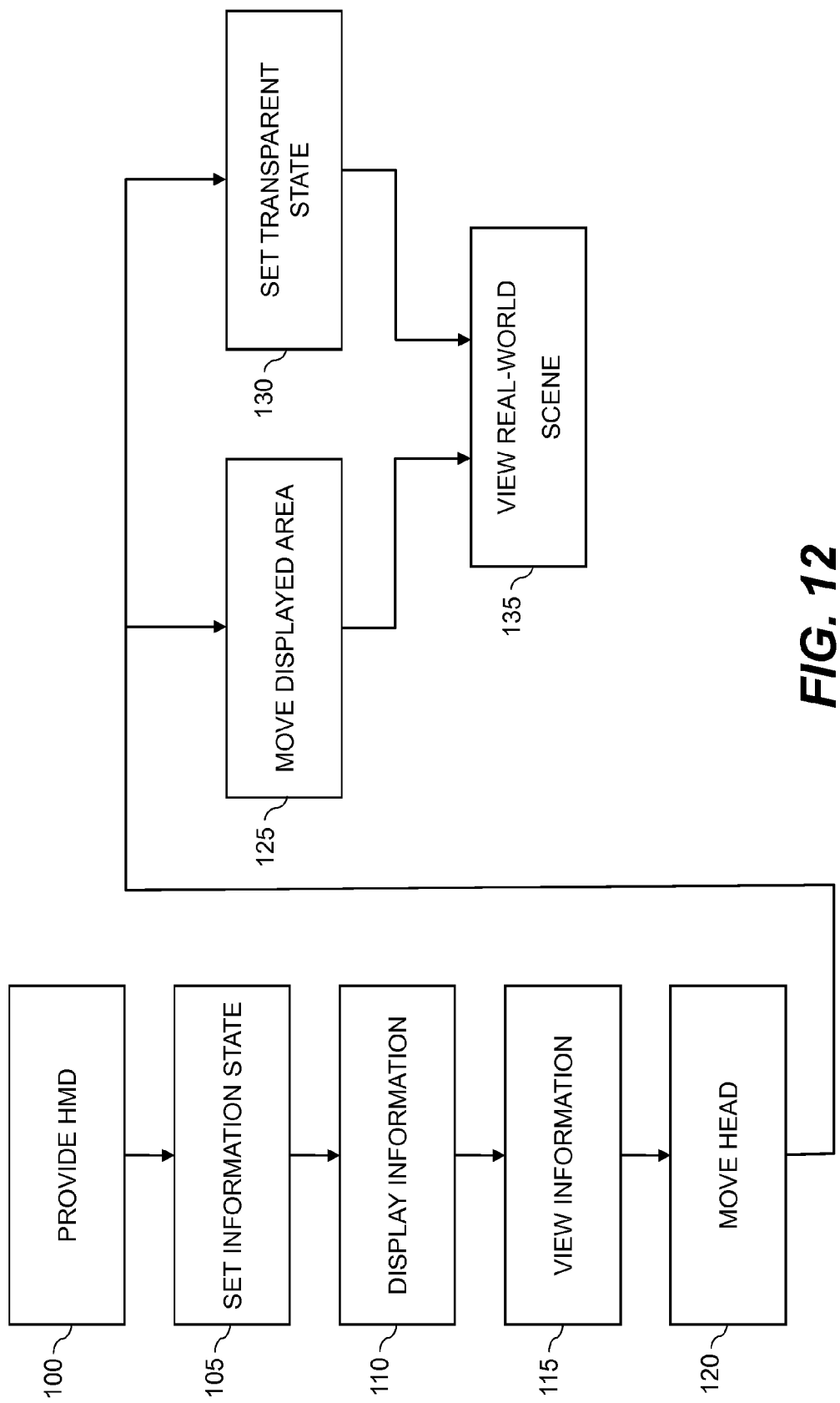
FIG. 12 is a flow chart illustrating a method according to an embodiment of the present invention.

Referring to FIG. 12, in accordance with a method of the present invention, a head-mounted display is provided in step 100. The head-mounted display is set in the information state in step 105 and image information is displayed at least in the switchable viewing area 11 in step 110 and viewed by a user in step 115. An external stimulus notification is received, for example by a signal from a sensor that detects movement of the user's head, in step 120. In response to the notification signal and the external stimulus, the head-mounted display apparatus and the switchable viewing area are automatically set in the transparent state in step 130, enabling the user to view the real-world scene in his or her line of sight in step 135.

The transition from the information state to the transparent state in the switchable viewing area is made gradually and in a variety of ways, according to various embodiments of the present invention. In one embodiment, the image information displayed on the switchable viewing area is moved to pan across the switchable viewing area and portions of the switchable viewing area are progressively switched from the information state to the transparent state as in Step 125 until the image information is no longer displayed in the switchable viewing area (as shown in FIGS. 9A to 9E and 10A to 10E). In an embodiment of the present invention, the panning movement of the image information is in an opposite direction to the movement of the head and in an amount corresponding to the amount of head movement, to provide a simulation of what a user might experience in the real world when viewing a scene and the head is moved (as shown schematically in FIGS. 9A to 9E and as discussed previously). By providing a panning movement to the image information on the display in correspondence with the head motion and in an opposite direction, motion sickness is mitigated as the image information is substantially fixed relative to the ambient environment as seen on the right edge of the image information shown in FIGS. 10A to 10E. The threshold at which a panning movement is deemed to occur is adjustable so that gradual head movements do not constitute an external stimulus notification which triggers a panning movement but more abrupt movements do. Thus, absolute position, relative position with respect to the body, or speed of movement can serve as external stimuli to trigger a switch in state to portions of the switchable viewing area state.

In other embodiments of the present invention, the transition of portions of the switchable viewing area from the information state to the transparent state is made by fading from one state to the other or by an instantaneous switch. A gradual transition can be made by applying an analog control signal of increasing or decreasing value, for example by applying an increasingly strong electric field. Alternatively, a gradual transition can be made by applying a digital control signal, for example by using time-division multiplexing between a transparent state and an information state in which the switchable viewing area is substantially opaque.

In some embodiments, the type of transition of the switchable viewing area from one state to another is based on detected external stimuli that trigger transitions from one state to another or based on an environmental attribute, for example the rate of transition is related to a measured brightness of the ambient environment. In another embodiment, the external stimulus can come from a timer so that a transition from one state to another occurs after a pre-determined time. Such an embodiment is particularly useful in switching from the transparent state to the information state. If users are interrupted in the viewing of image information, after the interruption and a switch to the transparent state, the head-mounted display apparatus 22 is returned automatically to the information state after a predetermined period of time.

When in the information state, the switchable viewing area is reflective, so that ambient light does not interfere with projected light rays carrying image information to the user's eye. When in the transparent state, the lens area need not be completely transparent. The entire lens area is partially darkened to reduce the perceived brightness of the ambient environment similar to sunglasses. Although FIGS. 10A to 10E show illustrations of combination images where the perceived brightness of the image information is similar to the perceived brightness of the see-through image of the ambient environment, in cases where the ambient environment is dark or where the lens area is partially darkened, the see-through image of the ambient environment is substantially less bright than the image information presented on the switchable viewing area. In one embodiment of the present invention, information is overlaid on the viewed real-world scene for example, as is done in an augmented reality system. The overlaid information is semi-transparent so that the real-world scene is viewed through the information. The overlaid information can be presented on the switchable viewing area or on the region of the lens area that surrounds the switchable viewing area.

Figure 13:
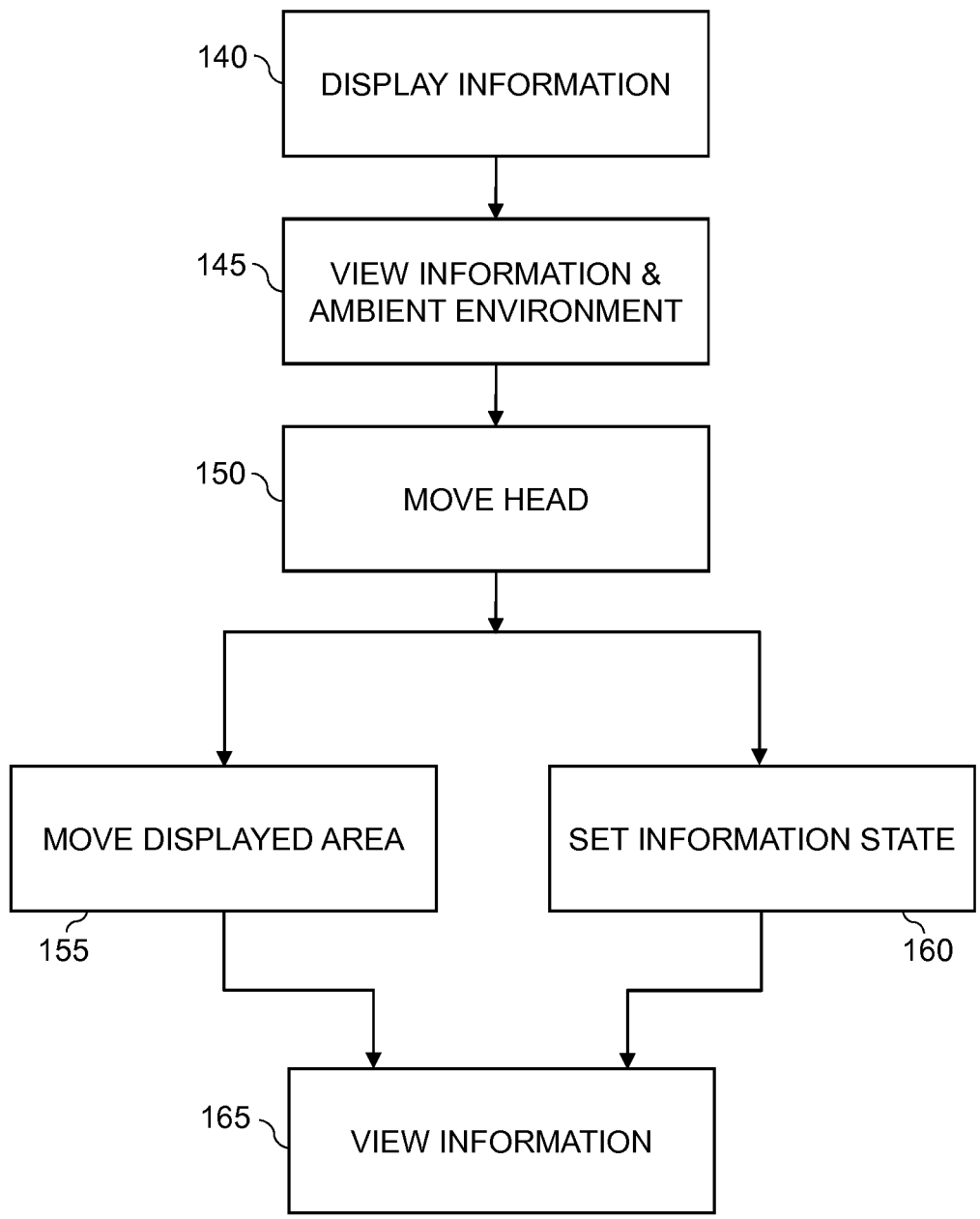
FIG. 13 is a flow chart illustrating a method according to an embodiment of the present invention.

Referring to FIG. 13, in a further embodiment of the present invention, a head-mounted display apparatus is in the transparent state and displaying information (step 140) to on the lens area to a user who views both the image information and an image of the ambient environment in his or her line of sight (step 145). A second external stimulus is provided (for example by moving the user's head) in step 150, the information is moved across the lens area in step 155, the head-mounted display apparatus is set into the information state in step 160 in response to the second external stimulus, and image information is viewed in the switchable viewing area in the information state in step 165. As noted above, the transition from one state to the other state is made gradually in a variety of ways. With reference to FIG. 8B, in one embodiment of the present invention, the image information displayed on the lens area is moved to pan into and across the lens area until it is displayed in the switchable viewing area. In an embodiment of the present invention, the panning movement of the image information is in an opposite direction to the movement of the head and in an amount corresponding to the head movement, to provide a simulation of what a user might experience when viewing a real-world scene and the user's head is moved.

In an embodiment of the present invention, image information presented to the user in either the transparent or information states is relevant to the external stimulus. In one embodiment, the external stimulus detector is a camera that captures images of the real-world scene surrounding the user, the controller analyzes the captured images and generates an indicator related to the external stimulus, the indicator is then displayed in the image information. For example, the external stimulus can be a detected approaching person, the indicator can be text such as "person approaching" that is then displayed to the user in the image information presented on the lens area. In addition, the controller may determine the direction that the person is approaching from and an arrow indicating the direction can be presented along with the text.

The above example corresponds to a user initially viewing image information in the head-mounted display apparatus in the information state, for example watching a video in an immersive state. An external stimulus occurs, for example an interruption by another person at the periphery of the user's vision. The user rotates his or her head about a vertical axis in the direction of the other person to view the other person. In response to the external stimulus, the head-mounted display apparatus switches from the immersive information state to the transparent state, permitting the user to view the other person directly. To mitigate motion sickness, as the user rotates his or her head, the displayed video information moves correspondingly across the displayed area in the opposite direction. This simulates the actual effect of a viewer watching an external display that is not head-mounted, for example a television fixed in a position in the user's sight. The external display will move across the viewer's field of view as the viewer rotates his or her head and no motion sickness is experienced. The movement of the displayed information across the viewing area in the opposite direction to the head rotation mimics the natural experience of a user that is not wearing a head-mounted display and is viewing a display with a fixed location.

In another example, a motion of the user's body is detected with an external stimulus detector that includes accelerometers and employed as the external stimulus. The motion and orientation of the user's head is used to determine a corresponding panning movement of the image information across the switchable viewing area. For example, if the user stands up or walks, it is useful to have at least a portion of the switchable viewing area switch from the information state to the transparent state to enable the user to perceive his or her real-world surroundings. In another example, the motion of the user's body is determined to be running the entire switchable viewing area is then switched to the transparent state. Image information is presented in an augmented reality form with the head-mounted display operating in a see-through fashion. Likewise, if the user sits down or otherwise stops moving, it is useful to switch from the transparent state to the information state to enable the user to view information. Note that panning the information across the switchable viewing area is done in a variety of directions, horizontally, vertically, or diagonally.

In one embodiment of the present invention, the image information is moved all of the way across the switchable viewing area. In another embodiment, the image information is moved only partway across the switchable viewing area. In this latter case, independently controllable portions of the switchable viewing area that switch between the information and transparent states permit a portion of the switchable viewing area to be used to display information in the information state while another portion of the switchable viewing area is in the transparent state and permits a user to perceive real-world scenes in his or her line of sight in the transparent state portion. This is useful, for example, when a motion on the part of the user would not naturally completely remove a portion of the real-world scene from the user's line of sight. For example, switchable viewing area portions and the associated electrodes can divide the switchable viewing area vertically into left and right portions or can divide the switchable viewing area horizontally into top and bottom portions. The switchable viewing area can also be operated such that a transparent portion is provided in the center of the switchable viewing area, to correspond most closely to the viewing direction of a user's line of sight.

In a further embodiment of the present invention, a plurality of adjacent independently controllable portions of the switchable viewing area can provide a spatially dynamic transition from one state to another by sequentially switching adjacent portions from one edge of the switchable viewing area across the switchable viewing area. Preferably, if the image information is moved across the switchable viewing area, the image information movement corresponds to the switching of the independently controllable portions of the switchable viewing area so that as the image information moves, the portions of the switchable viewing area from which the image information is removed are switched to the transparent state or the portions into which image information is added are switched to the information state.

As will be readily appreciated, according to various embodiments of the present invention, the head-mounted display apparatus and the switchable viewing area can also be switched from a transparent state to an information state and then back to a transparent state. In other cases, the switched state is left active, according to the needs of the user.

A variety of external stimuli are employed to automatically switch between the information and transparent states. In one embodiment of the present invention, a movement on the part of the user, for example movement of the head or body, can provide the external stimulus. The movement is an external-stimulus detector 6 (FIG. 6) which can include: an inertial sensor, head tracker, accelerometer, gyroscopic sensor, magnetometer or other movement sensing technology known in the art. The external-stimulus sensor is mounted on the head-mounted display apparatus 22 or is provided externally. The sensors can provide the external stimulus notification.

In another embodiment of the present invention, the biological state of the user is detected by the external stimulus detector 6 to determine, for example, if nausea or motion sickness is experienced. Detectable symptoms can include, for example, body temperature perspiration, respiration rate, heart rate, blood flow, muscle tension and skin conductance. The external-stimulus detector 6 can then include sensors for these symptoms such as, for example, sensors known in the medical arts, and are mounted on the head-mounted display apparatus 22 or be provided externally. The sensors can provide the external stimulus notification.

In yet another embodiment of the present invention, the state of the eyes of the user is detected by the external stimulus detector 6 to determine, for example, gaze direction, eye blink rate, pupil size, or exposed eye size. Eye sensors including cameras and reflectance detectors are known and are mounted on the head-mounted display apparatus 22 or are provided externally. The eye sensors can provide the external stimulus notification.

In an alternative embodiment of the present invention, the state of the environment external to the user and head-mounted display apparatus 22 is detected by the external stimulus detector 6 to determine, for example, temperature, air pressure, air composition, humidity, the presence of objects in the external environment, changes of objects in the environment or movement of objects in the external environment. Environmental sensors are known and are mounted on the head-mounted display apparatus 22 or be provided externally. Environmental sensors can include: thermocouples to measure temperature, pressure transducers to measure air pressure (or water pressure if used underwater), chemical sensors to detect the presence of chemicals, gas analyzers to detect gases, optical analyzers (such as Fourier transform infrared analyzers) to detect the presence of other material species, imaging systems with image analysis to identify objects and the movement of objects and infrared imaging systems to detect objects and the movement of objects in a dark environment, the sensors can provide the external stimulus notification.

Figure 14B:
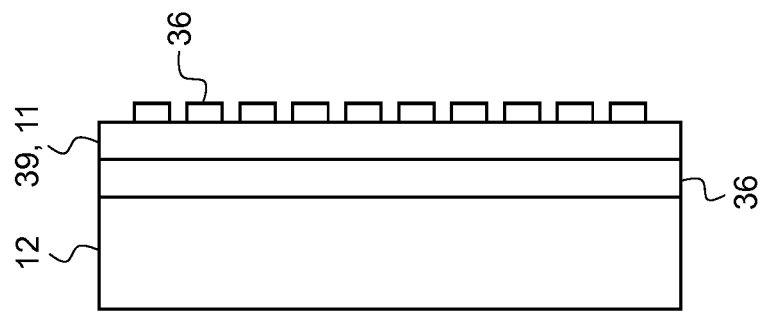
FIGS. 14A and 14B are schematic diagrams multiple independently controllable regions forming an array of squares.
Figure 14A:
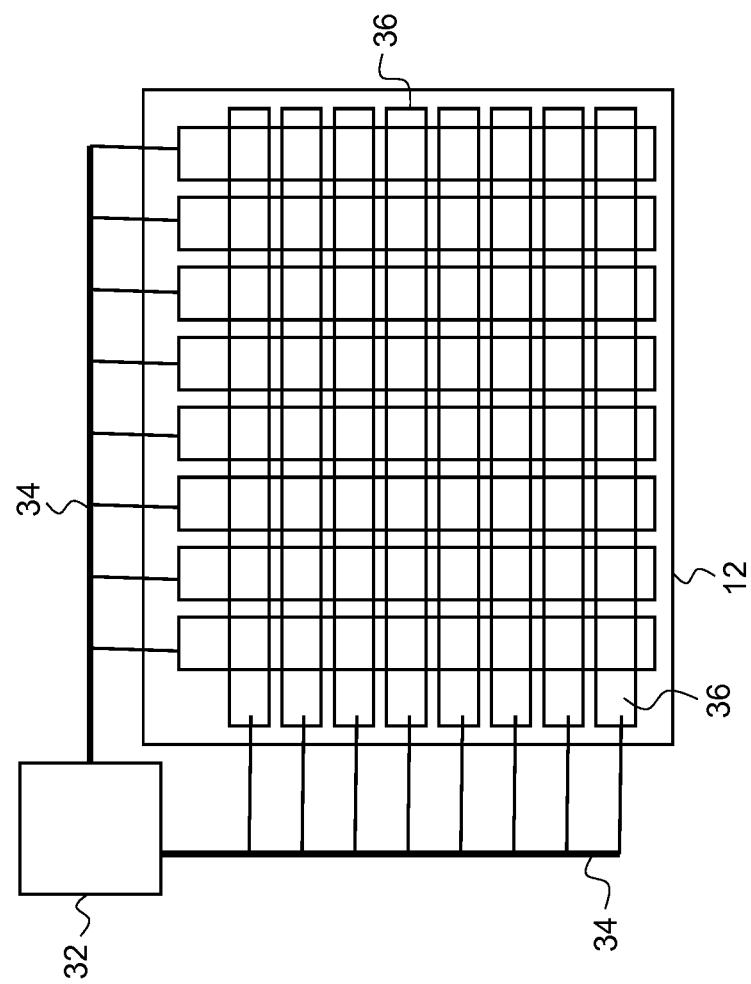

In a further embodiment of the invention, the switchable viewing area 11 includes a matrixed array of independently controllable portions across the switchable viewing area 11. FIG. 14A shows a schematic diagram of a matrixed array of independently controllable portions within the switchable viewing area 11. In this embodiment of the invention, lens area 12 can comprise a glass element, but not necessarily flat. The switchable array of portions is comprised of two orthogonal one-dimensional arrays of transparent electrodes 36 formed on the glass with an electrically responsive material 39 such as a liquid crystal pi cell layer, a polymer stabilized liquid crystal layer or an electrochromic layer located between each of the transparent electrodes 36 in the array. The transparent electrodes 36 are controlled with a controller 32 (that can include a computer or control electronics) in a passive-matrix configuration as is well known in the display art. Alternatively, an active-matrix control method is used, as is also known in the display art (not shown). In either the active- or the passive-matrix control method, the transparent electrodes 36 are transparent, comprising for example, indium tin oxide or zinc oxide. The electrically responsive material 39 changes its optical state from a substantially opaque reflective or absorptive state to a transparent state in response to an applied electrical field provided by the controller 32 through the wires 34 to the transparent electrodes 36. Transparent electrodes are known in the art (e.g. ITO or aluminum zinc oxide). Because each portion of a conventional passive-matrix controlled device in the switchable viewing area 11 is only switched for a part of a display cycle, light external to the display will be blocked for much of the time, resulting in a dim appearance of an external, real-world scene. Hence, an active-matrix control is preferred, especially if the control transistors are transparent and comprise, for example, doped zinc oxide semiconductor materials. FIG. 14B shows a schematic diagram of a cross-section of a switchable viewing area 11 with a matrixed array of independently switchable regions and associated electrodes 36 and the electrically responsive material 39.

The invention has been described in detail with particular reference to certain preferred embodiments thereof, but it will be understood that variations and modifications can be effected within the spirit and scope of the invention.

PARTS LIST 2 user's eye
3 partial reflectors
4 light rays passing from the microprojector
5 light rays from the ambient environment
6 stimulus detector
7 variable occlusion member
8 microprojector or image source
9 control electronics
10 head-mounted display apparatus
11 switchable viewing area
12 lens area
13 waveguide
14 ear pieces
20 user
22 head-mounted display apparatus
30 passive matrix control
32 controller
34 wires or buss
35 control wires
36 transparent electrodes
37 transparent electrode
38 transparent backplane electrode
39 electrically responsive material
60 transparent portion
62 object
100 provide HMD step
105 set information state step
110 display information step
115 view information step
120 move head step
125 move displayed area step
130 set transparent state step
135 view real world scene
140 display information step
145 view information and ambient environment step
150 move head step
155 move displayed area step
160 set information state step
165 view information step

The invention claimed is:

1. A method of controlling a head-mounted display, comprising the steps of:
   providing a head-mounted display having a display controller, the head-mounted display including a switchable viewing area that is switched by the display controller between a transparent viewing state, a partially transparent state, and an information viewing state, wherein:
      i) the transparent viewing state is transparent with respect to the switchable viewing area and enables a user of the head-mounted display to view a scene outside the head-mounted display in the user's line of sight;
      ii) the information viewing state is opaque with respect to the viewing area and displays information in the switchable viewing area visible to a user of the head-mounted display; and
      iii) the switchable viewing area includes a plurality of independently controllable switchable viewing areas that can each be independently controlled by the display controller to gradually transition between a transparent state and an information state through the partially transparent state;
   providing an external environmental state detector that provides an external stimulus notification in response to a detected change in an external environment; and
   using the display controller to individually, automatically, and gradually transition the viewing state of each of the plurality of independently controllable switchable viewing areas between the transparent viewing state and the information viewing state through the partially transparent state at a same time in response to the external stimulus notification after a predetermined period of time; wherein the transition of the viewing state is performed at a rate related to the measured brightness of the environment.

2. The method of claim 1, further including the steps of:
   setting the head-mounted display in the information state;
   receiving an external stimulus notification; and
   automatically switching the head-mounted display from the information state to the transparent state in response to the external stimulus notification.

3. The method of claim 1, further including the steps of:
   setting the head-mounted display in the transparent state;
   receiving an external stimulus notification; and
   automatically switching the head-mounted display from the transparent state to the information state in response to the external stimulus notification.

4. The method of claim 1, further including the step of moving the information displayed in the switchable viewing area across the switchable viewing area as the viewing state switches.

5. The method of claim 4, further including the step of moving the information displayed in the switchable viewing area across the switchable viewing area until the information is moved out of the switchable viewing area.

6. The method of claim 1, further including the step of sequentially switching adjacent portions and moving the information displayed in the switchable viewing area out of the switched adjacent portions across the switchable viewing area.

7. The method of claim 1, further including the steps of detecting a temperature, air pressure, air composition, humidity, objects in the external environment or movement of objects in the external environment.

8. The method of claim 1, further including the step of displaying information in the switchable viewing area when the switchable viewing area is in the transparent state.

9. The method of claim 8, further including the step of displaying semi-transparent information in the switchable viewing area when the switchable viewing area is in the transparent state.

10. The method of claim 8, further including the step of displaying information in a portion of the switchable viewing area that obscures a corresponding portion of the scene outside the head-mounted display in the user's line of sight.

11. The method of claim 1, further including the steps of:
   providing a second external stimulus notification in response to a detected change in the external environment; and
   causing the viewing state to automatically switch in response to the second external stimulus notification.

12. The method of claim 1, further including the step of presenting information in the switchable viewing area that is related to the external stimulus.

13. The method of claim 1, wherein the plurality of independently controllable switchable viewing areas are arranged in a two-dimensional array.

14. The method of claim 1, further including the step of switching the viewing state from the transparent state to the information state after the predetermined period of time.

15. A head-mounted display apparatus, comprising:
a head-mounted display, the head-mounted display including a switchable viewing area that is switched between a transparent state, a partially transparent state, and an information state, wherein:
  i) the transparent state enables a user of the head-mounted display to see a real world outside the head-mounted display in the user's line of sight;
  ii) the information state is opaque and displays information in the switchable viewing area visible to a user of the head-mounted display; and
  iii) the switchable viewing area includes a plurality of independently controllable switchable viewing areas that can each be independently controlled to gradually transition between a transparent state and an information state through the partially transparent state;
an external environmental-state detector that provides an external stimulus notification in response to a detected change in an external environment; and
a display controller for individually, automatically, and gradually transitioning a viewing state of each of the plurality of independently controllable switchable viewing areas between the transparent state and the information state through the partially transparent state at a same time in response to the external stimulus notification after a predetermined period of time; wherein the transition of the viewing state is performed at a rate related to the measured brightness of the environment.

16. The head-mounted display apparatus of claim 15, wherein the controller sets the head-mounted display in the information state, receives an external stimulus notification, and automatically switches the head-mounted display from the information state to the transparent state in response to the external stimulus notification.

17. The head-mounted display apparatus of claim 15, wherein the controller sets the head-mounted display in the transparent state, receives an external stimulus notification, and automatically switches the head-mounted display from the transparent state to the information state in response to the external stimulus notification.

18. The head-mounted display apparatus of claim 15, wherein the controller moves the information displayed in the switchable viewing area across the switchable viewing area as the viewing state switches.

19. The head-mounted display apparatus of claim 18, wherein the controller moves the information displayed in the switchable viewing area across the switchable viewing area until the information is moved out of the switchable viewing area.

20. The head-mounted display apparatus of claim 15, wherein the controller sequentially switches adjacent portions and moves the information displayed in the switchable viewing area out of the switched adjacent portions across the switchable viewing area.

21. The head-mounted display apparatus of claim 15, wherein the controller displays information in the switchable viewing area when the switchable viewing area is in the transparent state.

22. The head-mounted display apparatus of claim 15, wherein the controller displays semi-transparent information in the switchable viewing area when the switchable viewing area is in the transparent state.

23. The head-mounted display apparatus of claim 15, wherein the controller displays information in a portion of the switchable viewing area that obscures a corresponding portion of the scene outside the head-mounted display in the user's line of sight when the switchable viewing area is in the transparent state.

24. The head-mounted display apparatus of claim 15, further including environmental state sensors for detecting a temperature, air pressure, air composition, humidity, objects in the external environment or movement of objects in the external environment.

25. The head-mounted display apparatus of claim 15, further including an environmental state detector mounted on the head-mounted display.

26. The head-mounted display apparatus of claim 15, wherein the plurality of independently controllable switchable viewing areas are arranged in a two-dimensional array.

27. The head-mounted display apparatus of claim 15, further including a controller for switching the viewing state from the transparent state to the information state after the predetermined period of time.

* * * * *